May 17, 1932.  J. E. ROSBERG  1,858,600
APPARATUS FOR CURING MEATS
Filed Nov. 29, 1930  2 Sheets-Sheet 1

May 17, 1932.  J. E. ROSBERG  1,858,600
APPARATUS FOR CURING MEATS
Filed Nov. 29, 1930   2 Sheets-Sheet 2
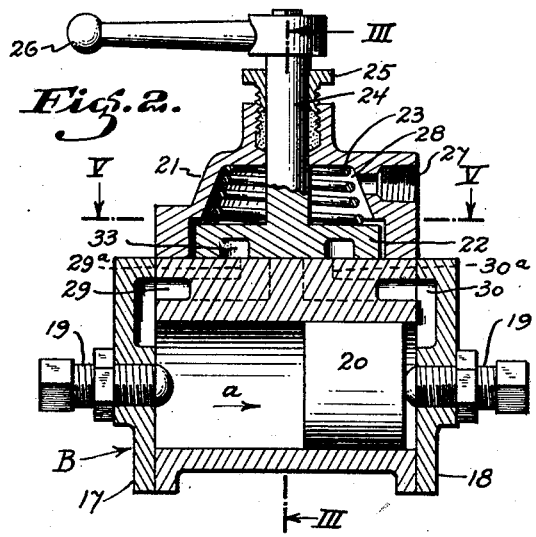
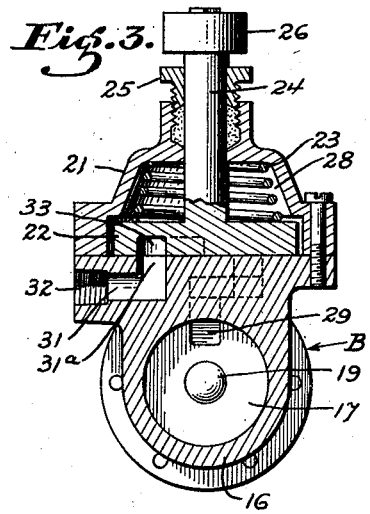
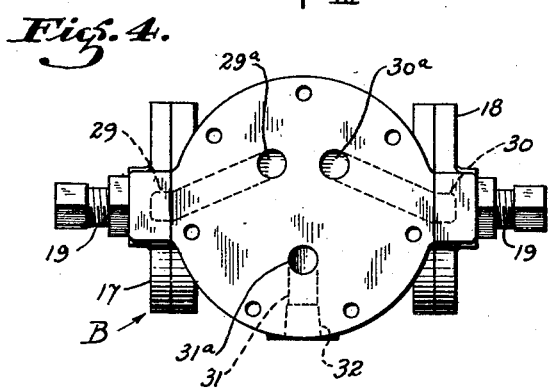
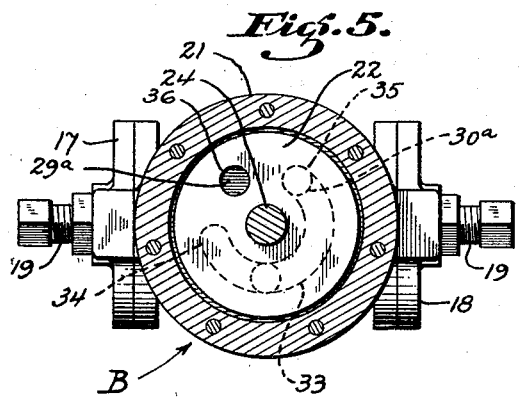
INVENTOR.
John E. Rosberg.
BY Townsend, Loftus & Abbett
ATTORNEYS.

Patented May 17, 1932

1,858,600

UNITED STATES PATENT OFFICE

JOHN E. ROSBERG, OF SAN FRANCISCO, CALIFORNIA, ASSIGNOR OF ONE-HALF TO TIEDEMANN & HARRIS, INC., OF SAN FRANCISCO, CALIFORNIA, A CORPORATION OF CALIFORNIA

APPARATUS FOR CURING MEATS

Application filed November 29, 1930. Serial No. 498,998.

This invention relates to an apparatus for curing meats, such as ham, bacon, corned beef, etc., by means of a brine solution or the like injected into a chunk of meat to be cured, and especially to an apparatus whereby measured quantities of a brine solution may be injected.

In a co-pending application entitled "Apparatus for treating meats" filed June 15th, 1930, Serial Number 463,627, I have fully disclosed an apparatus whereby brine or a like solution may be injected under pressure into a chunk of meat to be cured. The apparatus there disclosed is particularly intended for use in an average butcher shop where it is only intermittently employed, for instance, when one or more orders are received for corned beef or the like. In commercial application of an apparatus of this character as in a large meat packing plant where hundreds of hams, sides of bacon, etc., are being handled daily and where each article is graded as to size and weight it has been found desirable to inject the curing solution, such as brine, in measured quantities so as to obtain a uniform product.

The object of the present invention is to generally improve and simplify the construction and operation of apparatus of the character described; to provide a measuring apparatus whereby measured quantities of curing solution may be intermittently discharged; to provide means whereby the measuring apparatus is supplied and driven by curing solution driven thereto under a predetermined pressure; and, further, to provide a manually controlled valve mechanism whereby the measuring apparatus is controlled.

The invention is shown by way of illustration in the accompanying drawings, in which—

Fig. 2 is a longitudinal sectional view of the measuring apparatus,

Fig. 3 is a cross section taken on line III—III of Fig. 2,

Fig. 4 is a plan view of the cylinder showing the valve and valve cage removed,

Fig. 5 is a horizontal section taken on line V—V of Fig. 2.

Figure 1:
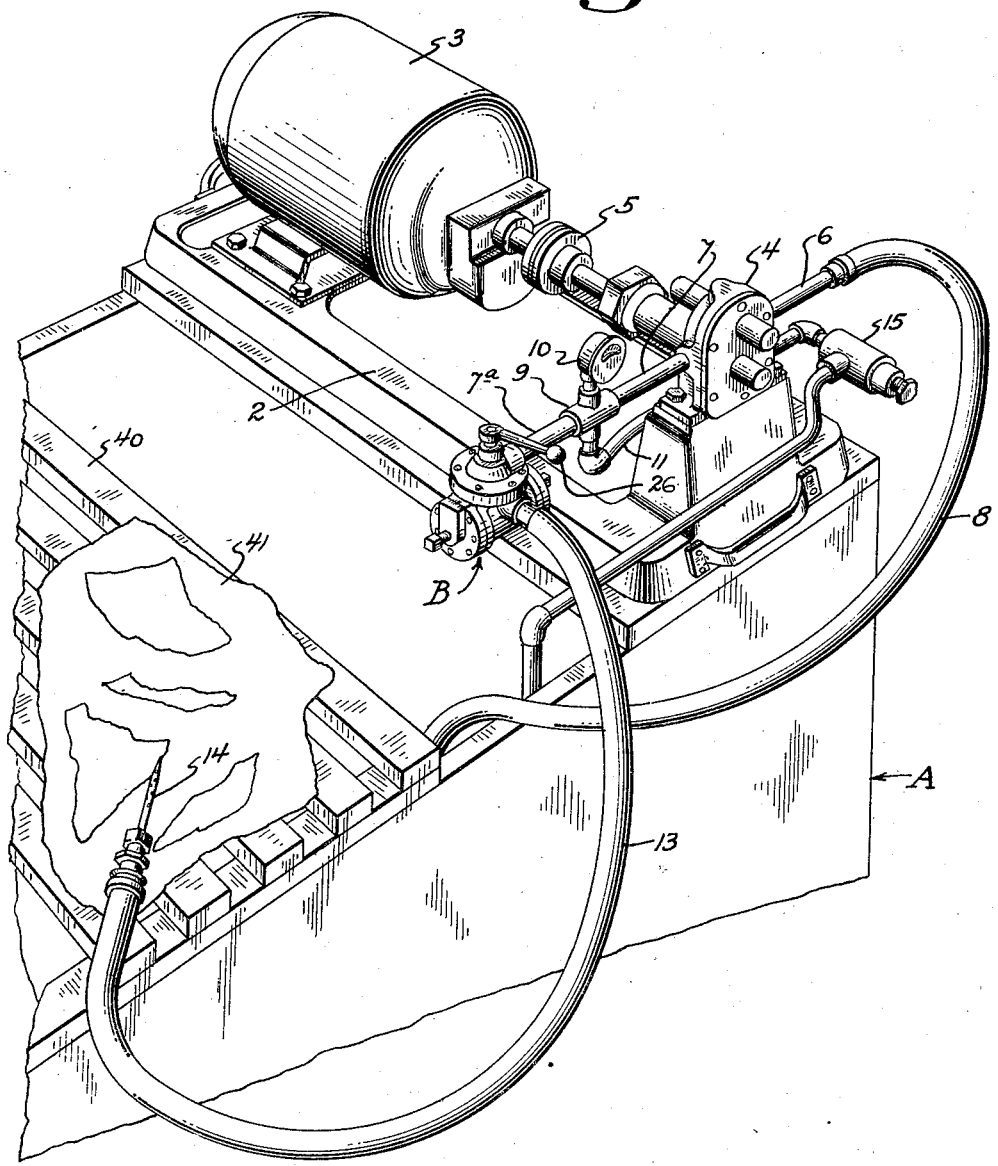
Fig. 1 is a perspective view showing the apparatus set up for use.

Referring to the drawings in detail and especially Fig. 1, A indicates a tank adapted to contain a curing liquid, such as brine or the like. Disposed at one end of the tank is a pumping unit comprising a base plate 2, an electric motor 3, and a pump 4. A rotary pump of the gear type is illustrated in the present instance and it is driven by the motor through a direct shaft coupling such as indicated at 5. Formed on one side of the pump is an inlet connection 6 and on the opposite side a discharge connection 7. Connected with the inlet connection 6 is a supply pipe or hose 8 which extends into the tank and disposed on the discharge side of the pump is a cross fitting 9 to which is connected a pressure gauge 10, a return pipe 11, and a manually controlled measuring device B, which is provided with a discharge hose 13 and an injecting needle 14, while the return pipe is provided with a relief valve 15.

The measuring device is best shown in Figs. 2 to 5, inclusive. It consists of a cylinder 16 which is provided with head members 17 and 18 on opposite ends. Carried by each head member is an adjustable screw plug 19 and disposed within the cylinder between said plugs is a floating piston 20. Disposed on top of the cylinder is a valve cage or bonnet 21 and mounted within said bonnet is a disc valve 22 which is held against its seat, or in other words, the upper face of the cylinder by means of a helical compression spring 23. The valve is secured to a stem 24 which extends through a stuffing box 25 formed on the upper end of the bonnet and the stem is provided with an operating handle 26 whereby it is actuated as will hereinafter be described. The brine or fluid under pressure discharged by the pump 4 passes through discharge pipe 7, the cross fitting 9, and pipe 7a, which is connected with the bonnet at the point indicated at 27. The liquid thus enters a chamber 28 formed within the bonnet and it is here directed by means of the valve to one end of the cylinder or the other through ports indicated at 29 and 30. The cylinder is provided with a third port indicated at 31 and this terminates in a discharge connection 32 to which the hose 13 and needle 14 is connected.

The disc valve 22 is provided on its lower surface with a groove or channel 33 which extends from the point 34 to the point indicated at 35 and it is also provided with a port 36 which extends completely through the valve from the upper to the lower surface The ports 29, 30 and 31 formed in the cylinder terminate upwardly extending ports 29a, 30a and 31a and these ports are controlled by the disc valve 22. When the valve is turned by means of the operating handle 26 to assume the position shown in Fig. 5, port 36 registers with port 29a, hence permitting the liquid under pressure delivered to the chamber 28 formed within the valve bonnet to pass downwardly through the port 36 into port 29a and thus pass into port 29 in one end of the cylinder and as the liquid is entering under pressure it will drive the piston in the direction of arrow a. Liquid previously admitted to the cylinder is at the same time discharged through ports 30 and 30a into the groove or channel 33 formed in the lower face of the valve and as this groove is in constant communication with the ports 31a and 31 the liquid previously admitted to the cylinder is discharged through the hose connection 13 and the needle 14. If the position of the valve is reversed by means of the operating handle, port 36 will be brought into register with port 30a and the liquid under pressure delivered to the valve bonnet will accordingly pass through said port and the ports 30a and 30 into the opposite end of the cylinder and thereby drive the piston in a direction opposite to arrow a, hence forcing out the liquid last delivered through the ports 29, 29a, channel 33, ports 31a and 31, and the hose 13 with connected needle 14.

From the foregoing it will be noted that the operation of the measuring apparatus is intermittent and that it is manually controlled and that a predetermined quantity of liquid is discharged during each operation. This predetermined quantity can be varied by increasing or decreasing the stroke of the floating piston and by changing the position of the adjusting screws 19.

In actual operation the meat to be cured is placed on a rack such as shown at 40 in Fig. 1. The circuit through the motor is closed and the moment this starts operating pump 4 will draw brine from the tank through the hose 8 and discharge it through the pipe 7 and the cross fitting 9 into the bonnet of the measuring cylinder. It can, however, pass no further until the valve is operated. A high pressure would under such conditions build up but this is prevented by providing the return pipe 11 and the relief valve 15, this valve being set to maintain a predetermined pressure in the pipe lines at all times and such pressure being indicated by the gauge 10. With the apparatus in operation and the liquid or curing solution circulating under a predetermined pressure it is only necessary for the operator to insert the needle 14 into the chunk of meat indicated at 41. He then turns the operating lever 26 to one side or the other and in so doing causes a measured quantity of liquid to be discharged through the hose 13 and needle 14 into the meat, the quantity injected being a measured quantity.

In actual practice it has been found that approximately two ounces of brine solution to each pound of meat should be injected, hence if the chunk of meat shown at 41 weighs ten pounds the needle will be inserted at five different places as the measuring device is adjusted to inject two ounces at each operation. If the next chunk of meat to be treated weighs twelve pounds the needle is inserted six times at different places and so on, hence it is possible to inject the same proportional quantity of curing solution in each chunk of meat treated and where larger chunks are being treated the quantity injected during each insertion of the needle may be increased by adjusting the screws 19 so as to permit an increased stroke of the piston, thus making it unnecessary to insert the needle more often than is necessary; this being of considerable importance as it obviously increases the average output of each operator.

While certain features of the present invention are more or less specifically described, I wish it understood that various changes may be resorted to within the scope of the appended claim. Similarly, that the materials and finish of the several parts employed may be such as the manufacturer may decide, or varying conditions or uses may demand.

Having thus described my invention, what I claim and desire to secure by Letters Patent is—

In an apparatus of the character described a measuring device comprising a cylinder having a pair of ports formed therein and connected with opposite ends of the cylinder, a valve housing having a chamber formed therein in communication with said ports, means for delivering a liquid under pressure to said chamber, a discharge port formed in the cylinder, a piston in the cylinder, a disc valve mounted in the housing, said valve having a port formed therein adapted to direct liquid under pressure to either end of the cylinder and said valve having a channel formed in its lower surface which is in constant communication with the discharge port and which is adapted to register with either end of the cylinder alternately, and means for imparting an oscillating movement to the valve to bring its port into register with one end of the cylinder and the channel into register with the opposite end of the cylinder or vice versa.

JOHN E. ROSBERG.